(12) United States Patent
Gharib et al.

(10) Patent No.: US 9,415,428 B2
(45) Date of Patent: Aug. 16, 2016

(54) METHODS AND SYSTEMS FOR SELF-CLEANING OF PHOTOVOLTAIC PANELS

(71) Applicants: Morteza Gharib, Altadena, CA (US); Derek Rinderknect, Arcadia, CA (US)

(72) Inventors: Morteza Gharib, Altadena, CA (US); Derek Rinderknect, Arcadia, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 14/461,270

(22) Filed: Aug. 15, 2014

(65) Prior Publication Data

US 2015/0047688 A1 Feb. 19, 2015

Related U.S. Application Data

(60) Provisional application No. 61/866,470, filed on Aug. 15, 2013.

(51) Int. Cl.
*H02S 30/10* (2014.01)
*F24J 2/46* (2006.01)
*B08B 7/02* (2006.01)
*H02S 40/10* (2014.01)

(52) U.S. Cl.
CPC . *B08B 7/02* (2013.01); *F24J 2/461* (2013.01); *H02S 40/10* (2014.12)

(58) Field of Classification Search
CPC ......... H02S 40/10; H02S 40/30; H02S 40/34; B08B 7/02; H01L 27/20
USPC ......................................... 136/251, 252, 259
See application file for complete search history.

(56) References Cited

U.S. PATENT DOCUMENTS

| | | | |
|---|---|---|---|
| 7,830,926 B1 * | 11/2010 | Kim | B82Y 20/10 372/20 |
| 7,999,173 B1 | 8/2011 | Ashpis | |
| 2006/0023013 A1 * | 2/2006 | Oku | B41J 2/0451 347/12 |
| 2009/0014057 A1 | 1/2009 | Croft et al. | |
| 2010/0212093 A1 | 8/2010 | Pak et al. | |
| 2011/0283477 A1 | 11/2011 | Ashpis | |
| 2012/0285516 A1 | 11/2012 | Mckarris | |
| 2013/0047978 A1 | 2/2013 | Slocum et al. | |

FOREIGN PATENT DOCUMENTS

WO WO2011092670 A2 * 8/2011
WO WO 2013/065053 A1 5/2013

OTHER PUBLICATIONS

WO, PCT/US2014/051367 ISR, Dec. 2, 2014.

* cited by examiner

*Primary Examiner* — Susan D Leong
(74) *Attorney, Agent, or Firm* — One LLP

(57) ABSTRACT

Systems, devices, and methods are provided for self-cleaning photovoltaic panels that utilize piezo devices capable of causing vibrational movement in the panels.

17 Claims, 8 Drawing Sheets

METHODS AND SYSTEMS FOR SELF-CLEANING OF PHOTOVOLTAIC PANELS

CROSS-REFERENCE TO RELATED APPLICATIONS

The present application claims priority to and the benefit of U.S. provisional application Ser. No. 61/866,470 filed on Aug. 15, 2013, which is incorporated by reference herein in its entirety for all purposes.

FIELD

The subject matter described herein relates generally to systems, devices, and methods for self-cleaning photovoltaic panels.

BACKGROUND

Solar power is the conversion of sunlight into electricity and is becoming increasingly popular as a renewable source of energy. Large-scale solar power installations are often composed of thousands of photovoltaic cells (also called solar cells) spread over large tracts of land. One major problem facing large-scale solar power installations is the accumulation of dust over photovoltaic cells, thereby decreasing the ability of the cells to receive sunlight and convert the sunlight into power. According to some published data, a dust layer of one-seventh of an ounce per square yard decreases solar power conversion by 40 percent. Dust layer deposition rates are even higher in the Middle East and other desert areas where large scale solar power installations are typically located. In this respect, a self-cleaning mechanism for the surface of solar cells would both increase the efficiency and reduce the cost of maintenance for solar installations.

Photovoltaic cells are often organized into modules, electrically connected, and mounted on a supporting structure called a photovoltaic panel or solar panel. Based on the size and quantity of solar panels in a large-scale solar panel installation, it can be a difficult and time consuming process to clean each panel. Many prior photovoltaic panel cleaning methods and systems have been created, a number of which required the use of water to clean the photovoltaic panels. This approach is impractical for photovoltaic panels installed in the Middle East and other desert areas where rain is infrequent because water may be costly, may evaporate quickly, and outdoor usage may be highly regulated by local authorities. In some instances hydrophobic films have been suggested to simplify the removal of dust during precipitation but with low levels of precipitation these films are ineffective.

Other systems involve the induction of strong electromagnetic or electrostatic fields through electrically sensitive material deposited on glass to repel dust particles that have settled on the photovoltaic panels. The presence and use of strong electrostatic fields near sensitive photovoltaic cells that may be charged poses a high risk of electrostatic discharge as well as the risk of electrocution for nearby people and animals. Also, addition of any extra layer of materials, even if transparent, can negatively affect light transmission from the sun or reflectors to the cells underneath. This reduces the efficiency with which the photovoltaic cells may gather light for conversion to electricity. While certain piezo devices have been proposed for cleaning photovoltaic panels, those devices are implemented only as a supplementation for a cleaning system that primarily utilizes electrostatic fields.

Some prior attempts at solving dust settling problems have used passive structures built onto photovoltaic panels in an attempt to create air currents over the surface of the photovoltaic panels. While these structures may remove some dust from the surface of photovoltaic panels, they require natural airflow (i.e., wind) over the panels and do not provide for fine-tuning if the wind is inadequate for removing dust particles. Thus, needs exist for improved self-cleaning photovoltaic panels or cells.

SUMMARY

Provided herein are embodiments of systems and devices related to self-cleaning photovoltaic panels and other arrayed surfaces of photovoltaic cells, as well as methods of their use and manufacture. These embodiments are capable of removing dust, dirt, and other particles and fluids (collectively referred to as "debris') from the surface of the photovoltaic panels in order to maintain high levels of solar ray exposure for conversion to electric power. Certain embodiments can use very low amplitude vibrations on the photovoltaic glass panels at frequencies in the kilohertz range to accomplish the removal.

In these embodiments, small piezoelectric drivers (or any driver that can transfer mechanical vibrational energy) are placed in strategic locations to maximize their cleaning effect. Integrated sensors can monitor the debris accumulation level on the surface of the panel and activate piezoelectric drivers that vibrate and shake-off the debris whenever dust concentrations reach critical levels. Certain embodiments can be configured such that the debris moves off of the panel (due to the panel inclination) as soon as the debris is vibrationally lifted from the surface. Acoustic streaming can be additionally (or alternatively) used to induce debris motion through high frequency traveling or standing waves on the surface of the photovoltaic panel. The piezo devices can also be used to develop rotating air currents, such as eddy flows, that facilitate debris uplift from the panel into relatively more non-rotating, linear air currents passing further above that, in turn, can carry the debris off of the panel. These embodiments can be implemented in both dry and wet weather over small and large-scale photovoltaic installations.

Other systems, devices, methods, features and advantages of the subject matter described herein will be or will become apparent to one with skill in the art upon examination of the following figures and detailed description. It is intended that all such additional systems, devices, methods, features and advantages be included within this description, be within the scope of the subject matter described herein, and be protected by the accompanying claims. In no way should the features of the example embodiments be construed as limiting the appended claims, absent express recitation of those features in the claims.

BRIEF DESCRIPTION OF THE FIGURES

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely.

DETAILED DESCRIPTION

Before the present subject matter is described in detail, it is to be understood that this disclosure is not limited to the particular embodiments described, as such may, of course, vary. It is also to be understood that the terminology used herein is for the purpose of describing particular embodiments only, and is not intended to be limiting, since the scope of the present disclosure will be limited only by the appended claims.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

Figure 1:
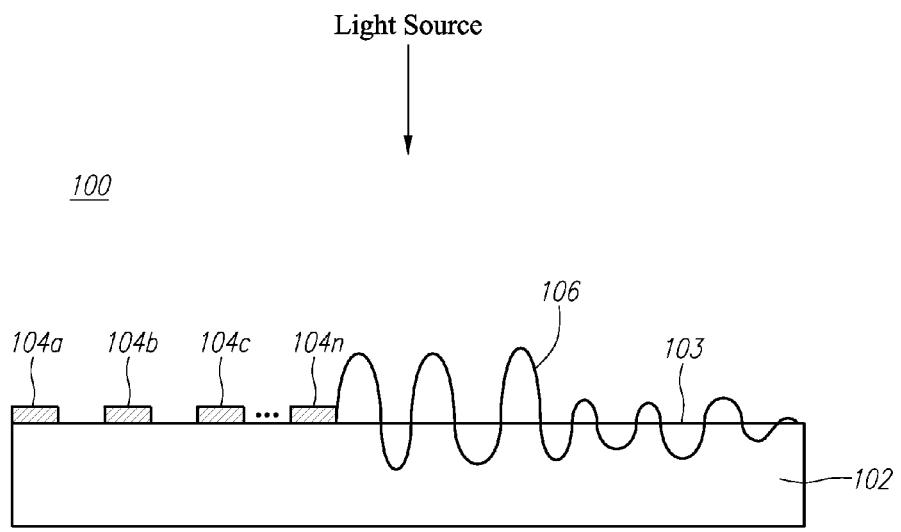
FIG. 1 is a side view of an example embodiment of a self-cleaning photovoltaic panel with a waveform.

Turning now to an example embodiment, FIG. 1 is a side view of a self-cleaning photovoltaic system 100. Here, piezo devices 104A-N have elongate shapes and are mounted on the surface of a photovoltaic panel (e.g., solar panel) 102. Panel-type structures are the most common implementation of photovoltaic devices, but the embodiments described herein are likewise applicable to any other photovoltaic structure that is susceptible to the accumulation of debris on its surface.

While not limited to such, the embodiments of the piezo devices described herein can include a suitable piezo material element coupled with an electrode for applying voltage thereto. When an electrical field is applied to the piezo material element, the inverse piezoelectric effect causes the production of acoustic waves 106, which in some embodiments are ultrasonic. Debris located on an upper surface 103 of panel 102 can be shaken free and carried by acoustic waves 106 across upper surface 103 to an end of panel 102 where they can fall off an edge of upper surface 103 or otherwise be moved out of a position that reduces the incidence of photons onto the energy conversion elements (e.g., cells, not shown) of panel 102. In some embodiments waves 106 may be created when adjacent piezo devices have different polarities. For instance, piezo device 104A may have a positive polarity while piezo device 104B has a negative polarity and piezo device 104C has a positive polarity. These polarities can be manipulated with control circuitry (described herein) to alternate back and forth between positive and negative.

In this and all other embodiments described herein, piezo devices 104A-N can be configured with either the same or different widths, lengths, heights and spacing. Width is the dimension along a short axis of an individual piezo device 104A-N, length is the dimension along a long axis of an individual piezo device 104A-N, and height is the dimension from the lower surface an individual piezo device 104A-N to the upper surface of the individual piezo device 104A-N. (In the embodiment of FIG. 3, the length of the piezo devices is along the X-axis, the width is along the Y-axis, and the height is along the Z-axis.) In some embodiments, piezo devices 104A-N have uniform widths. In other embodiments, piezo devices 104A-N have non-uniform widths such that some piezo devices 104A-N are wider than others. Likewise, in some embodiments lengths or heights of individual piezo devices 104A-N can be uniform while in other embodiments lengths or heights can be non-uniform. Similarly, in some embodiments spacing between piezo devices 104A-N can be uniform while in other embodiments spacing can be non-uniform. Based on the particular physical dimensions of each piezo device 104A-N and its physical orientation with respect to other piezo devices 104A-N, different waveforms can be created and manipulated as required. Likewise, it should be understood that some design choices may be better suited than others for particular installation locations of the self-cleaning photovoltaic system 100 based on the size of typical debris particles, frequency of waves required to move debris particles and common air properties at the installation location.

Properties common to many types of piezo devices are that they are generally compact/small in size, allow for a high degree of control, have short response times, long lifetimes, require low voltage supplies to operate, provide no backlash or play, consume little power when static and can be operated effectively in severe environmental conditions. As such they are well suited to installation in solar arrays.

Various different piezo devices may be used in different embodiments described herein. Some examples of current piezo devices include amplified piezo devices, ultrasonic piezo devices, ultrasonic piezo drives and linear and rotating piezo motors, although it should be understood that other applicable currently available piezo devices and future developments should also be covered herein.

Suitable materials for the piezo elements can include various types of synthetic crystals, synthetic ceramics, lead-free piezoceramics, polymers, organic nanostructures and other materials. Examples of synthetic crystals include gallium orthophosphate ($GaPO_4$) and Langasite ($La_3Ga_5SiO_{14}$), both of which are quartz analogic crystals. Synthetic ceramics include tetragonal unit cell of lead titanate. Ferroelectric ceramics with randomly oriented grains may also exhibit piezoelectricity. Textured polycrystalline non-ferroelectric piezoelectric materials including AlN and ZnO exhibit macroscopic piezoelectricity. Ceramics including perovskite, tunsgsten, bronze, barium titanate (BaTiO3), lead zirconate titanate (PZT), potassium niobate (KNbO3), lithium niobate (LiNbO3), lithium tantalate (Na2WO3), sodium tungstate (Na2WO3), zinc oxide (ZnO), Ba2NaNb5O5, Pb2KNb5O15 and others can be used. Lead-free piezoceramics include sodium potassium niobate (((K,Na)NbO3) or (NKN)), bismuth ferrite ($BiFeO_3$), sodium niobate ($NaNbO_3$), bismuth titanite ($Bi_4Ti_3O_{12}$), sodium bismuth titanate ($Na_{0.5}Bi_{0.5}TiO_3$), and others can be used. Polymers such as polyvinylidene fluoride (PVFD) and others can be used. Organic nanostructures such as diphenylalanine peptide nanotubes (PNTs) and others can be used.

Piezo devices may have many different shapes and structures and can be manufactured in a variety of sizes and dimensions. Piezo devices can have elongate shapes (bars, strips, elliptical, and the like) or uniform shapes (circular disks, rings, and the like). Sheets, plates, disks, polygonal shapes (square, rectangular, pentagonal, hexagonal, and the like), and rounded shapes, are just a few examples. In various embodiments, appropriate shapes and dimensions are chosen based on the frequencies desired for a particular application. Ceramic piezos typically provide adequate movement for the applications in these embodiments.

Figure 2:
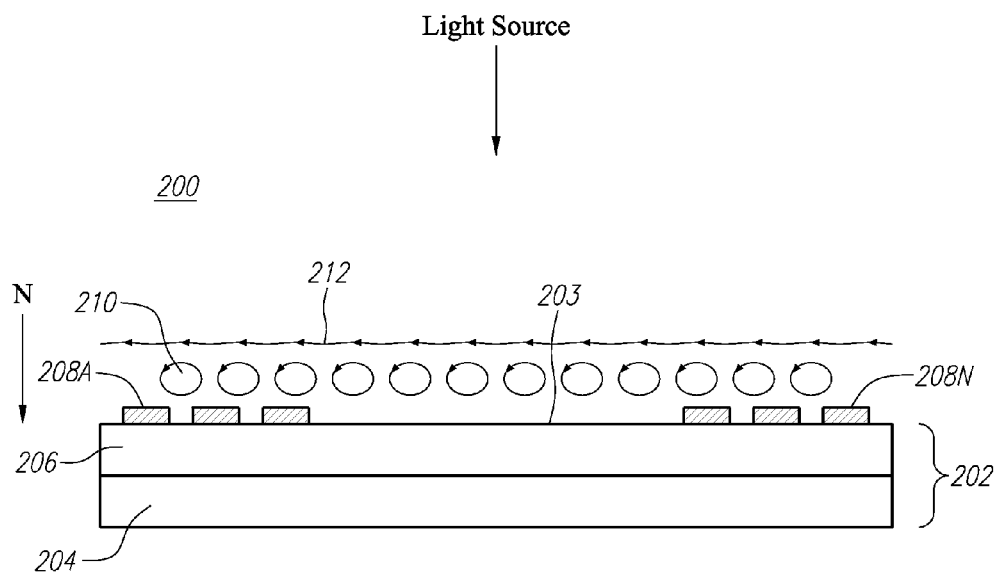
FIG. 2 is a side view of an example embodiment of a self-cleaning photovoltaic panel with several example waveforms.

FIG. 2 is a side view of an example embodiment of a self-cleaning photovoltaic panel 200 with example airflow streamlines 210 and 212. Here, panel 202 can include a photovoltaic layer 204 and a cover layer 206. Piezo devices 208 are mounted on upper (light source facing) surface 203 of cover layer 206. Mounting can be achieved by integration during manufacturing of photovoltaic panel 202. In some embodiments, piezo devices 208 are mounted using glue, epoxy, resin, or other adhesive substances. Adhesive substances can be chosen such that the acousto-mechanical coupling will maintain a rigid bond to provide transmission of waves at desired frequencies and not break down or become supple during activation.

Piezo devices 208A-N are used to create discrete, localized airflow movements 210 above surface 203 of panel 202. Discrete movements 210 can operate similar to eddy currents in that they may be relatively small currents rotating in a generally circular fashion that are induced in the air immediately above surface 203. As similar movements can be created based on uniformity in sizes and placements of piezo devices 208, the upper portion of each discrete movement 210 results in net airflow in direction 212, which is generally perpendicular to a normal direction (N) of surface 203. It should be understood that airflow along direction 212 does not exist separate from discrete movements 210 but rather is representative of the bulk air motion across the upper portion of all discrete movements 210.

Figure 3:
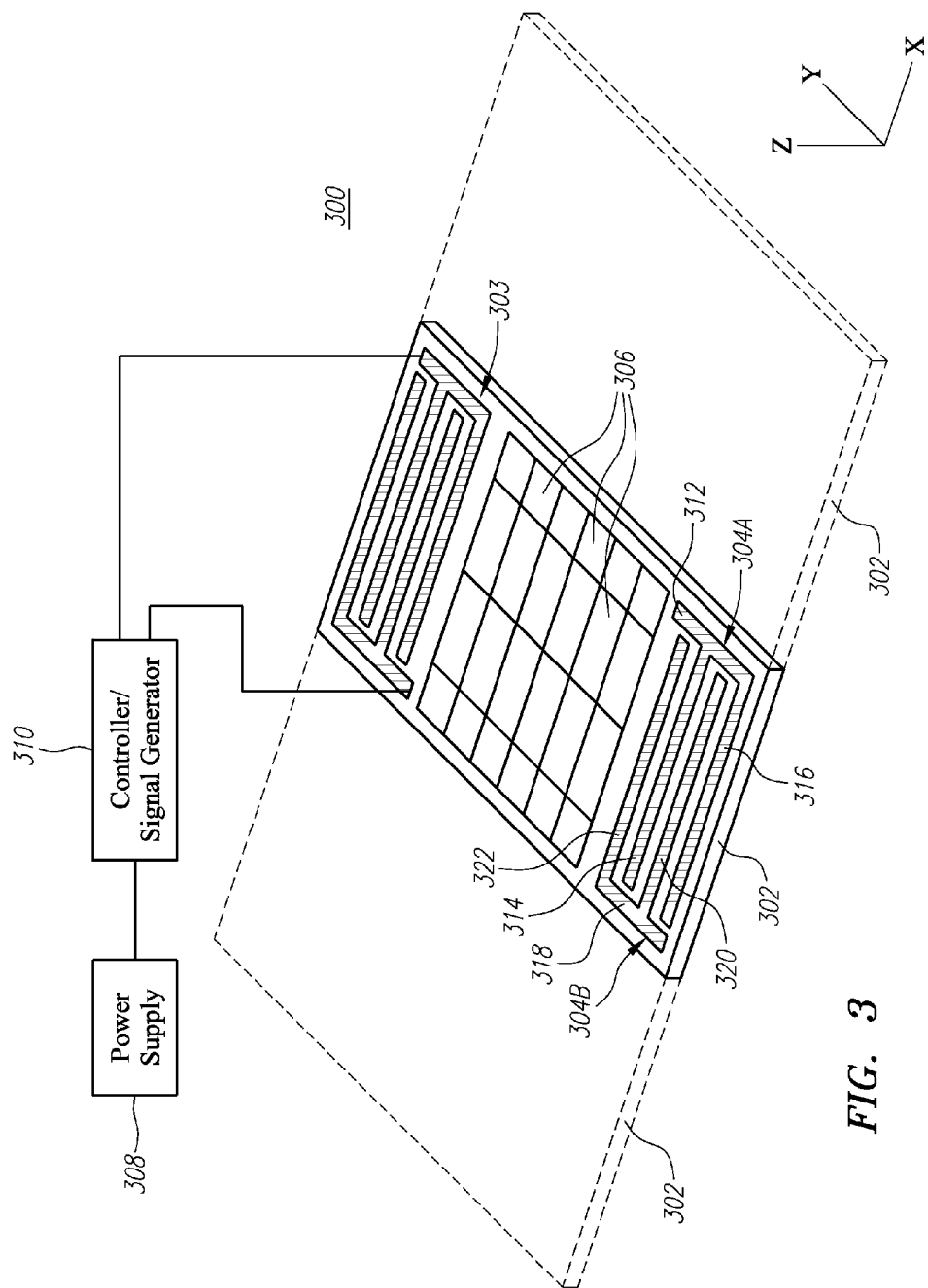
FIG. 3 is a perspective view of an example embodiment of a self-cleaning photovoltaic panel array with an attached power supply and controller/signal generator.

FIG. 3 is a perspective view of an example embodiment of a self-cleaning photovoltaic system 300 with a power supply 308 and control circuitry 310 (e.g., a controller, processor, and/or signal generator, and the like). Here, three panels 302 are shown in system 300 with the center one being shown in greater detail and the peripheral outline of the side panels 302 shown with dotted lines. Panel 302 has numerous photovoltaic modules 306. Piezo devices 304 are arranged at each end on upper surface 303 of panel 302, on either side of the photovoltaic modules 306 in regions that can be referred to as edge regions or peripheral regions. Power supply 308 can provide power to control circuitry 310.

In this and the other example embodiments described herein, piezo devices 304 can be configured in an interdigital arrangement, where multiple piezo devices in the shape of elongate struts, or "fingers," are placed adjacent each other.

Here a first interdigital piezo device 304A includes a first common rail 312 and a first set of extension rails 314, 316. First common rail 312 can be parallel and adjacent to a side edge of panel 302, and the first set of extension rails 314, 316 can extend perpendicularly from first common rail 312 such that each extension rail is parallel to the others.

A second interdigital piezo device 304B is arranged in a similar but opposite fashion and includes a second set of extension rails 320, 322 that are connected to a second common rail 318. The second set of extension rails 320, 322 each extends between adjacent ones of the first set of extension rails 314, 316, such that assortment of rails are placed in an alternating fashion. The second common rail 318 can be parallel and adjacent to an opposite edge of solar panel 302 from first common rail 312. Although first set of extension rails 314, 316 are connected by common rail 312 and second set of extension rails 320, 322 are connected by common rail 318, each interdigital piezo device 304A and 304B need not include a common rail and can be configured such that each extension rail is individually connected to the driving electronics (e.g., control circuitry 310 and power supply 308). In such an embodiment, each extension rail can be individually controlled. In embodiments where non-uniform spacing, width, height, or length of interdigital piezo devices 304 is used, it may be necessary to individually control each interdigital piezo device 304 in order to create waves that effectively and efficiently move debris across surface 303 of panels 302.

In some embodiments electrodes (not shown) may cover an entire surface (e.g., the surface directly facing the panel) of each piezo device 304. This can be done to standardize electric potential across the entire piezo device 304. For example, an electrode can be installed on panel 302 such that it has the same dimensions as piezo device 304 and therefore covers a bottom surface of piezo device 304 when mounted on it. Typically, inert metals such as nickel act as adequate electrodes for the embodiments herein, although others may be used.

In many embodiments piezo devices can be non-monolithic. In some embodiments this can be a "checkerboard" or other grid with insulated electrical connections such that adjacent piezo devices have alternating electrical connections across a row or column of the "checkerboard" arrangement. This non-monolithic arrangement can provide differing airflow characteristics over the surface of the solar panel which may be advantageous in some environments. Non-monolithic piezo devices can have regular patterns while in some embodiments non-monolithic piezo devices may have semi-regular or irregular patterns.

Control circuitry 310 can control the power applied to the piezo devices using one or more controllers, processors, programmable logic, and digital-to-analog converters. Control circuitry 310 can also include or be coupled to memory for the storage of control software. Control circuitry 310 is operable to change the size and shape of waves created by piezo devices 304 including manipulating the amplitude and frequency of created waves by changing the power applied to the piezo devices. Target waveforms that can be created include sine waves, square waves, sawtooth waves, and others. Control circuitry 310 in some embodiments can include multiple processors performing different tasks. For example, a processor may perform control of piezos while another processor performs overall system tasks such as performing the process steps described with respect to FIG. 8. Alternatively, a single processor could perform all tasks.

Power supply 308 in the example embodiment can be used to supply power to control circuitry 310 to power piezo devices 304. In various embodiments power supply may be a battery, generator, or others. In some embodiments power supply 308 can be a battery which recharges using power generated by solar panel 302 itself. As such, no additional power supply need be used and the self-cleaning photovoltaic panel array 300 can be self-sufficient. In some embodiments a backup power supply can be integrated such that if a primary power supply fails the backup power supply can be used to provide power for operation of the self-cleaning photovoltaic panel array 300.

In some embodiments communication transceivers operable to transmit and/or receive communications via transmission media such as wires and/or electromagnetic waves can be included along with control circuitry 310 to allow for greater user control and monitoring of self-cleaning photovoltaic system 300. In some embodiments this can allow users the ability to manually override internal processes. This can be useful, for example, if a sensor for sensing dust on the surface of solar panel 302 malfunctions or otherwise is not operating effectively, so that a user may manually begin a self-cleaning mode by operating the piezo devices 304.

Figure 4:
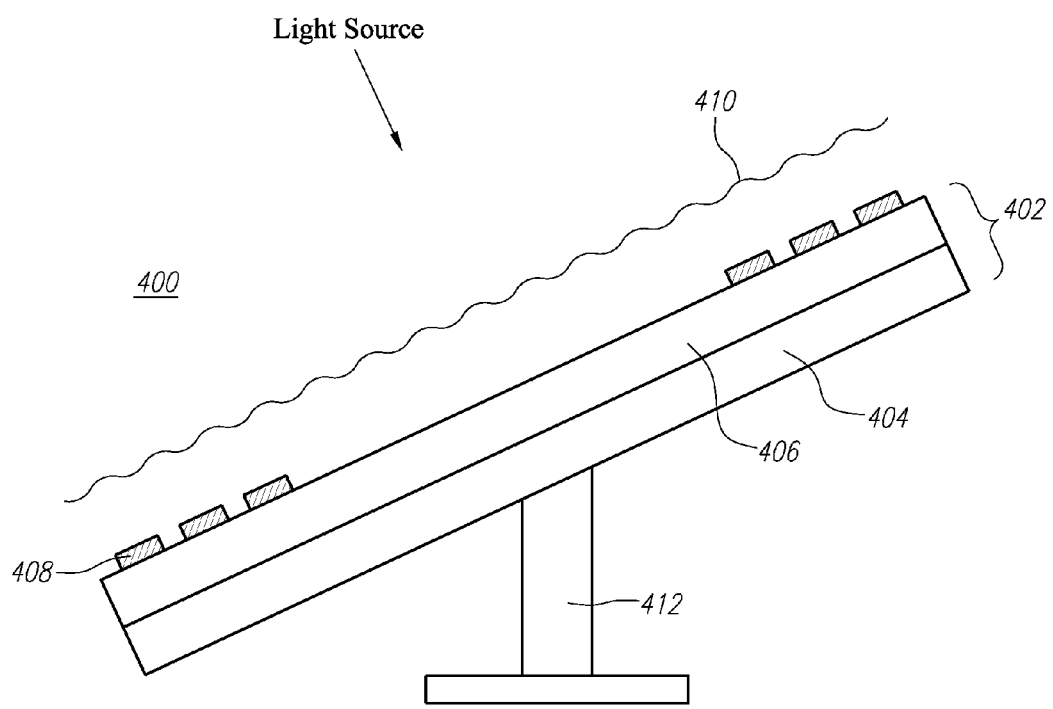
FIG. 4 is a side view of an example embodiment of a self-cleaning photovoltaic panel with a base.

FIG. 4 is a side view of an example embodiment of a self-cleaning photovoltaic system 400 with a base 412. In the example embodiment a solar panel 402 can have a photovoltaic layer 404 and a cover layer 406 that is mounted on the upper surface of photovoltaic layer 404. Piezo devices 408 can be mounted on the upper surface of cover layer 406. Piezo devices 408 are operable to create standing and traveling waves 410 along the upper surface of cover layer 406, which in turn can create airflow currents such as those described with respect to FIG. 2.

In some embodiments self-cleaning photovoltaic systems can use solar tracking mechanisms in order to maximize power production. In such embodiments electro-mechanical devices such as motors, actuators, controllers, control logic, memory, power sources and other technology can be operably connected to maximize power production by keeping self-cleaning photovoltaic panels at an optimal angle for solar reception. In some embodiments in which solar tracking mechanisms are used and others where they are not, self-cleaning photovoltaic systems can have motors and other mechanisms which tilt the panels during self-cleaning modes. This tilting can be used to take advantage of gravity such that operation of piezo devices creates a "downhill" net flow along the surface of the panels in a direction that can assist debris removal.

Figure 5:
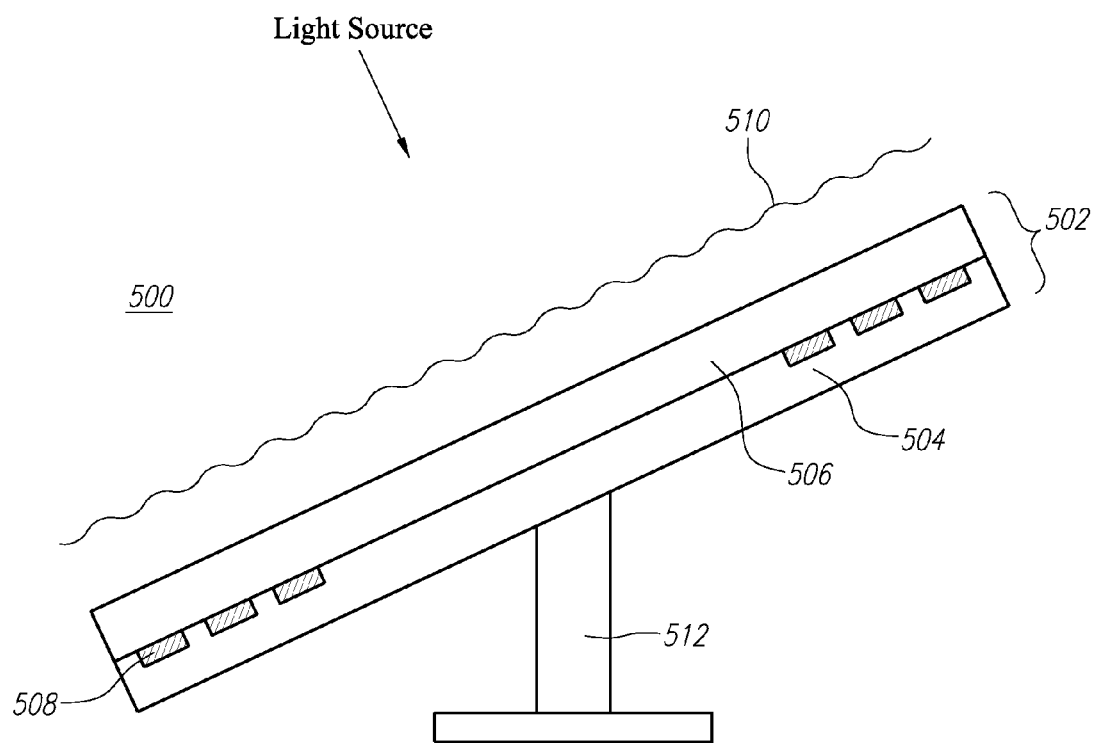
FIG. 5 is a side view of another example embodiment of a self-cleaning photovoltaic panel with a base.

FIG. 5 is a side view of another example embodiment of a self-cleaning photovoltaic system 500 with a base 512. In the example embodiment a solar panel 502 can have a cover layer 506 and a photovoltaic layer 504. In the example embodiment piezo devices 508 are embedded in the upper surface of photovoltaic layer 504. Cover layer 506 is disposed over the upper surface of photovoltaic layer 504, above piezo devices 508. This embodiment can be operated in a similar manner to the other embodiments described herein. In some embodiments, flexible piezo devices may be used where flexible solar panels are used.

Figure 6:
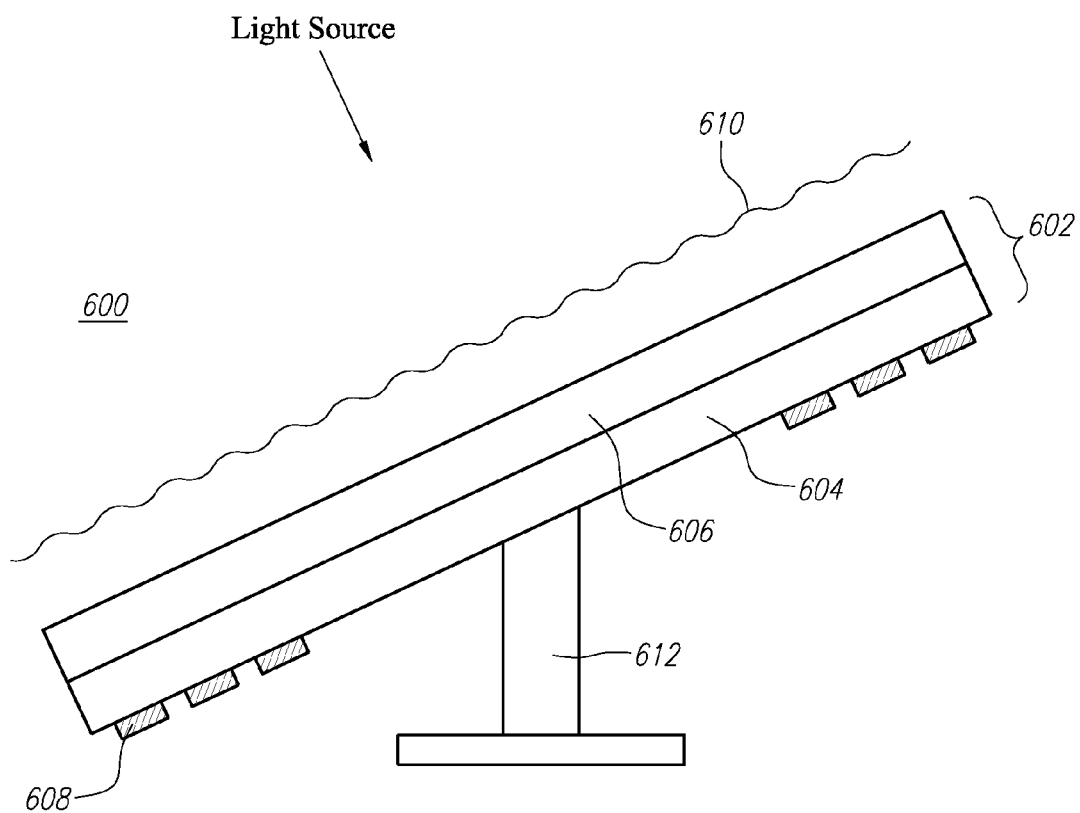
FIG. 6 is a side view of another example embodiment of a self-cleaning photovoltaic panel with a base.

FIG. 6 is a side view of another example embodiment of a self-cleaning photovoltaic panel 600 with a base 612. In the example embodiment a solar panel 602 can have a cover layer 606 and a photovoltaic layer 604 where cover layer 606 is mounted on the upper surface of photovoltaic layer 604. In the example embodiment piezo devices 608 are mounted on the bottom of the lowest surface of photovoltaic layer 604 such that they are underneath solar panel 602. This embodiment can also be operated in a similar manner to the other embodiments described herein.

Figure 7A:
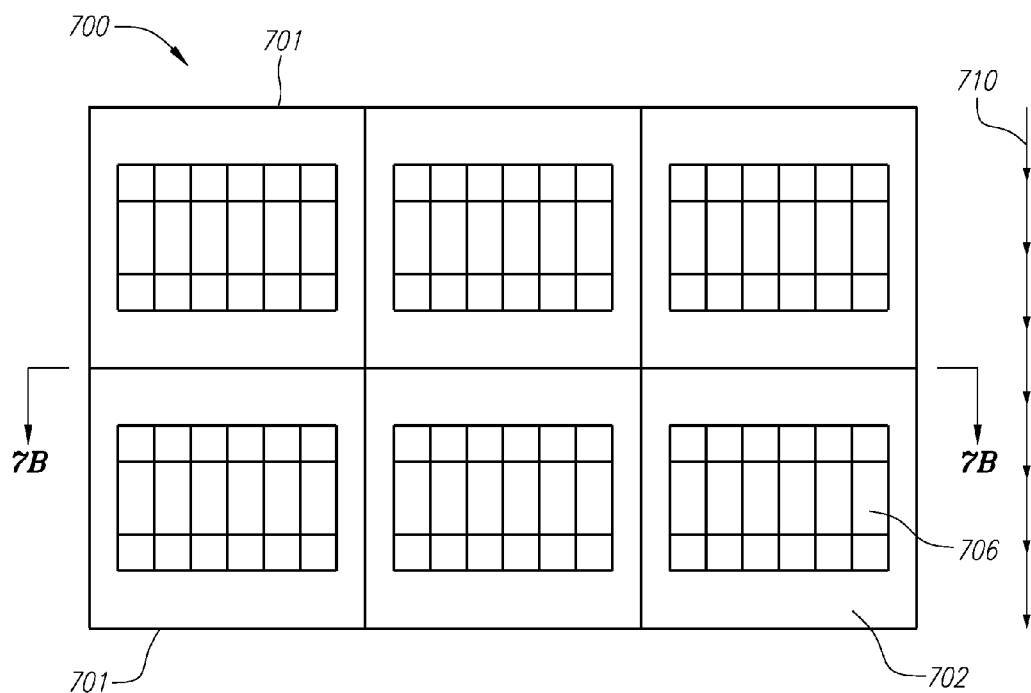
FIG. 7A is a top view of an example embodiment of a self-cleaning photovoltaic panel array.

FIG. 7A is a top view of an example embodiment of a self-cleaning photovoltaic panel system 700. In the example embodiment a base 702 and photovoltaic modules 706 are shown for each self-cleaning photovoltaic panel 701. An overall flow 710 shows the flow of dust particles across the surface of photovoltaic panel array 700 caused by piezo devices (omitted from FIG. 7A and shown in FIG. 7B) below photovoltaic modules 706.

Figure 7B:
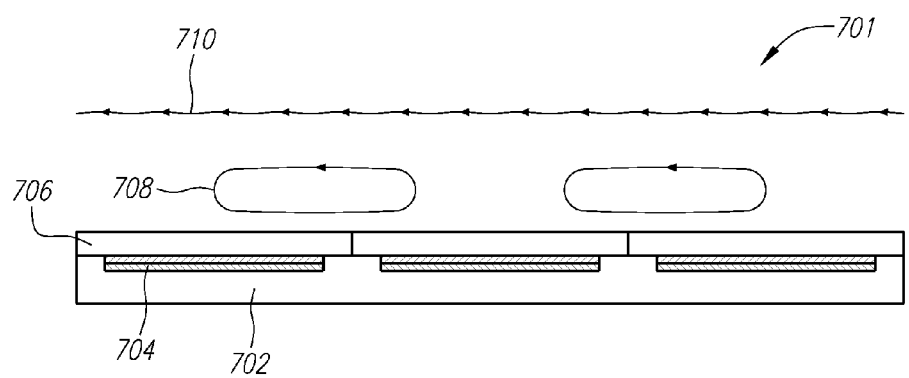
FIG. 7B is a side view of the example embodiment of a self-cleaning photovoltaic panel array as shown in FIG. 7A.

FIG. 7B is a side view of an example embodiment of a self-cleaning photovoltaic panel 701 as incorporated in the self-cleaning photovoltaic panel array 700 shown in FIG. 6A. In the example embodiment a base 702 can include mounting locations where piezo device 704s are installed. A photovoltaic module 706 can be mounted above the piezo device 704s. In operation the piezo actuator 704s can create discrete air movements 708 that contribute to an overall flow 710, similar to the description with respect to FIG. 3.

Figure 8:
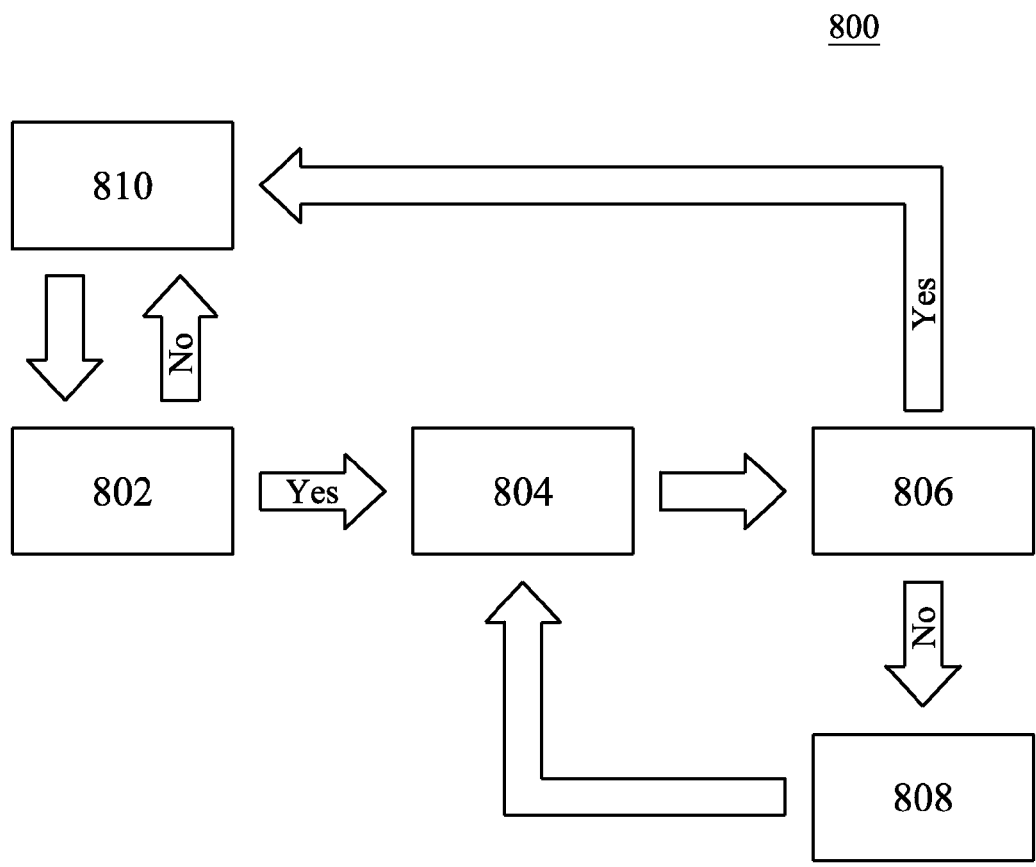
FIG. 8 is a flowchart of an example embodiment of a self-cleaning photovoltaic panel process including analysis of environmental conditions.

FIG. 8 is a flowchart 800 showing an example embodiment of a self-cleaning process including analysis of environmental conditions. In the example embodiment the self-cleaning photovoltaic system can first sense whether debris has collected on the surface of the self-cleaning photovoltaic panel at 802. If the self-cleaning photovoltaic panel does not sense an appreciable amount of debris then the self-cleaning photovoltaic panel can enter a sleep, wait or hibernation mode at 810 wherein the self-cleaning photovoltaic panel waits before performing 802 again. However, if an appreciable amount of debris is sensed at 802 then the self-cleaning photovoltaic system can proceed to 804. At 804 the piezo devices of the self-cleaning photovoltaic panel are activated, causing removal of debris from the self-cleaning photovoltaic panel according to any of the manners described herein, or otherwise. Next, at 806, the self-cleaning photovoltaic panel can perform a follow-up measurement to sense if an appreciable amount of debris remained after activation of the piezo devices. If the self-cleaning photovoltaic panel determines that a sufficient amount of the debris was removed then the self-cleaning photovoltaic system can proceed to 810. However, if the self-cleaning photovoltaic system determines that an appreciable amount of debris remains on the panel then the self-cleaning photovoltaic system can proceed to 808 and adjust (enlarge) the amplitude and/or adjust the phase of the piezo devices to create greater vibrational displacement to more effectively remove debris. After this adjustment the self-cleaning photovoltaic panel can then return to 804 and activate the piezo devices with the adjusted amplitude and/or phase.

In some embodiments, 802 can be achieved by monitoring the efficiency of one or more photovoltaic modules of the self-cleaning photovoltaic panel without any additional sensing equipment. Monitoring the efficiency can include determining if there has been a decrease in power production from the one or more photovoltaic modules. Hardware, software or a combination of both may be used to log power production over time and analyze changes by comparing existing, real-time or recent data with expected, typical, or average levels. Alternatively or additionally, power production minimum efficiency thresholds may be set for individual or groups of photovoltaic modules or whole photovoltaic panels whereby a drop below the minimum efficiency threshold can trigger performance of 804.

In other embodiments, 802 can be achieved using secondary sensors to determine whether an appreciable amount of debris has accumulated on the self-cleaning photovoltaic panel. Various types of sensors can be used in alternative embodiments and the sensors can be placed in various locations to optimize the effectiveness of each sensor. For example, infrared sensors can be used. Alternatively or additionally, light reflectivity sensors can be used in some embodiments to measure the light reflected from the photovoltaic panels.

In some embodiments Step 806 may occur concurrently with step 804. While debris is being removed in step 804, real-time measurement of solar energy conversion efficiency can occur in step 806 such that as debris is being removed solar energy conversion efficiency increases. Once a preprogrammed minimum threshold is reached the system may move to 810.

Step 810 may last for a preprogrammed length of time (e.g. seconds, minutes, hours, days or any other amount or subset of time) and/or may be manually overridden by an operator at an operably coupled control terminal.

Figure 9:
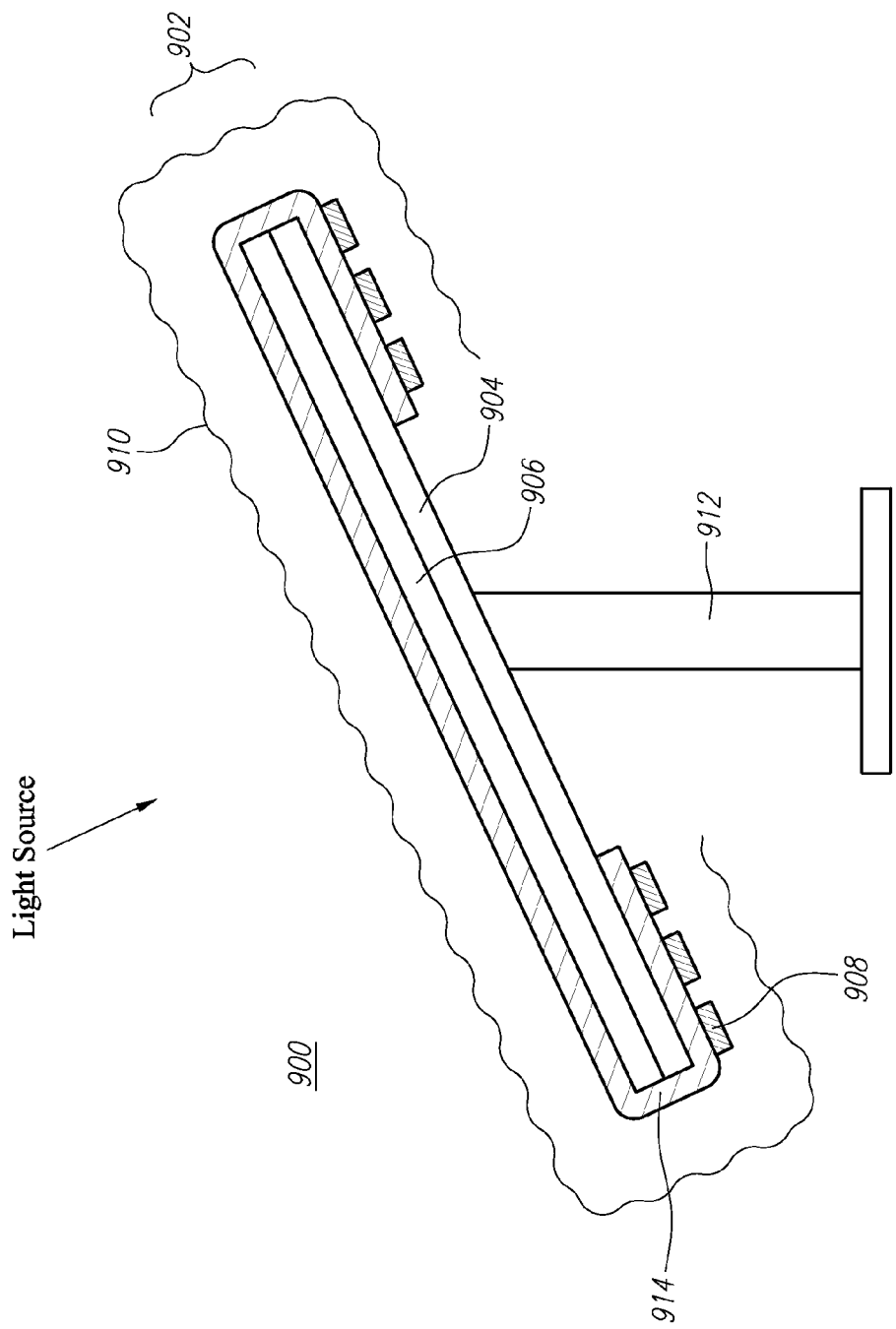
FIG. 9 is a side view of another example embodiment of a self-cleaning photovoltaic panel with a base.

FIG. 9 is a side view of another example embodiment of a self-cleaning photovoltaic panel 900 with a base 912. Here, panel 902 can have a photovoltaic layer 904 and a cover layer 906 that is mounted on the upper surface of photovoltaic layer 904. A coupling layer 914 may cover all or part of the surface of panel 902 that faces the light source, as well as other surfaces. Coupling layer 914 can be transparent such that it does not significantly impede the operation of photovoltaic layer 904. In the example embodiment coupling layer 914 wraps around the edges of panel 902 and piezo devices 908 are mounted on a portion of coupling layer 914 that is on the side of panel 902 opposite the light source. This embodiment can also be operated in a similar manner to the other embodiments described herein.

Although the embodiments described herein relate generally to use of piezo devices for self-cleaning photovoltaic panels, it should be understood that various other embodiments exist in which piezo devices can be used for cleaning debris off of exposed surfaces.

Although the embodiments described herein relate generally to reactively cleaning debris off surfaces, piezo devices can also be used in various embodiments to proactively prevent debris from settling on surfaces. For example, if an operator has advanced knowledge that a dust storm is approaching a self-cleaning solar panel array the operator can enable piezo devices to operate. This operation can operate constantly such that dust will not settle on the solar panel and the solar panel can have a clean upper surface even after the dust storm.

In many instances entities are described herein as being coupled to other entities. It should be understood that the terms "coupled" and "connected" (or any of their forms) are used interchangeably herein and, in both cases, are generic to the direct coupling of two entities (without any non-negligible (e.g., parasitic) intervening entities) and the indirect coupling of two entities (with one or more non-negligible intervening entities). Where entities are shown as being directly coupled together, or described as coupled together without description of any intervening entity, it should be understood that those entities can be indirectly coupled together as well unless the context clearly dictates otherwise.

As used herein and in the appended claims, the singular forms "a", "an", and "the" include plural referents unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

What is claimed is:

1. A self-cleaning photovoltaic system, comprising:
a photovoltaic panel;
a plurality of piezo devices coupled to the photovoltaic panel such that vibration of the piezo devices transfers to the photovoltaic panel; and
control circuitry adapted to cause the plurality of piezo devices to vibrate,
wherein the control circuitry is adapted to actuate at least one piezo device with a first polarity and to actuate at least one other piezo device with a second, opposite polarity.

2. The system of claim 1, wherein the plurality of piezo devices are coupled to the photovoltaic panel in positions that allow the formation of rotating air currents above the photovoltaic panel when the plurality of piezo devices are vibrated.

3. The system of claim 2, wherein the control circuitry is adapted to vibrate the plurality of piezo devices such that rotating air currents are formed above the photovoltaic panel and a net flow is generated in a direction generally perpendicular to a normal to a light source facing surface of the panel.

4. The system of claim 3, wherein the net flow is of sufficient strength to remove a substantial accumulation of debris on the photovoltaic panel.

5. The system of claim 1, wherein the plurality of piezo devices are located on a first exterior surface of the photovoltaic panel adapted for facing the light source during photovoltaic operation.

6. The system of claim 1, wherein the plurality of piezo devices are wholly located within the interior of the photovoltaic panel.

7. The system of claim 1, wherein the plurality of piezo devices are located on a second exterior surface opposite to a first exterior surface of the photovoltaic panel, the first exterior surface adapted for facing the light source during photovoltaic operation.

8. The system of claim 1, wherein the plurality of piezo devices are located along a side edge of the photovoltaic panel.

9. The system of claim 1, wherein the photovoltaic panel comprises a base layer, a transparent or semi-transparent cover layer, and a photovoltaic layer located therebetween.

10. The system of claim 1, wherein the plurality of piezo devices are coupled to the photovoltaic panel in positions that allow the formation of a standing or a traveling wave along the photovoltaic panel when the plurality of piezo devices are vibrated.

11. The system of claim 1, wherein the piezo devices are located only in an edge region of the photovoltaic panel when viewed from a perspective normal to a primary light collecting face of the photovoltaic panel.

12. The system of claim 11, wherein a plurality of photovoltaic cells are located in an interior region of the photovoltaic panel when viewed from a perspective normal to the primary light collecting face.

13. The system of claim 1, wherein the photovoltaic panel comprises a plurality of photovoltaic modules, each photovoltaic module comprising a plurality of photovoltaic cells, wherein at least one of the plurality of piezo devices is located beneath each of the photovoltaic modules so as not to obstruct the passage of light into the plurality of photovoltaic modules.

14. The system of claim 1, wherein the plurality of piezo devices comprises at least one piezo device configured as an elongate member.

15. The system of claim 1, wherein the plurality of piezo devices comprises a plurality of piezo devices configured as interdigital elongate members.

16. The system of claim 1, wherein the plurality of piezo devices are coupled to the photovoltaic panel in positions that allow debris to be removed through vibration and gravity.

17. The system of claim 1, wherein each of the plurality of piezo devices comprises a piezo material element and an electrode.

* * * * *